United States Patent [19]
Miles, Jr.

[11] Patent Number: 5,269,127
[45] Date of Patent: Dec. 14, 1993

[54] ROTARY MULCHING MOWER

[76] Inventor: Charles Miles, Jr., 804 S. 16th St., Mattoon, Ill. 61938

[21] Appl. No.: 958,797

[22] Filed: Oct. 9, 1992

[51] Int. Cl.⁵ .................... A01D 34/72; A01D 57/12
[52] U.S. Cl. ........................ 56/502; 56/193; 56/255
[58] Field of Search ............ 56/13.2, 14.3, 14.4, 56/14.8, 17.3, 255, 501, 502, 503, 16.4, 193

[56] References Cited

U.S. PATENT DOCUMENTS

| | | | |
|---|---|---|---|
| 2,564,352 | 8/1951 | Bjorklund | 56/502 |
| 2,631,418 | 3/1953 | Ronning | 56/502 |
| 3,688,479 | 9/1972 | Martinson et al. | 56/502 X |

*Primary Examiner*—David J. Bagnell
*Attorney, Agent, or Firm*—S. Michael Bender

[57] ABSTRACT

A rotary mulching mower has a rotating impeller or rake mounted anteriorly of a shredder rotor assembly. The latter comprises a motor driven rotatable member or rotor supporting circumferentially spaced rows of radially extending shredding pins extending below and above the disk. The upwardly extending pins mesh with complimentary stator pins mounted on the mower housing above the shredding rotor. Leaves or other lawn debris are passed by the impeller into a manifold and then directed via a suitable baffle to the meshing pins to be shredded thereby into mulch whereas the downwardly directed pins function effectively to remove thatch from the lawn being mulch mowed.

8 Claims, 4 Drawing Sheets

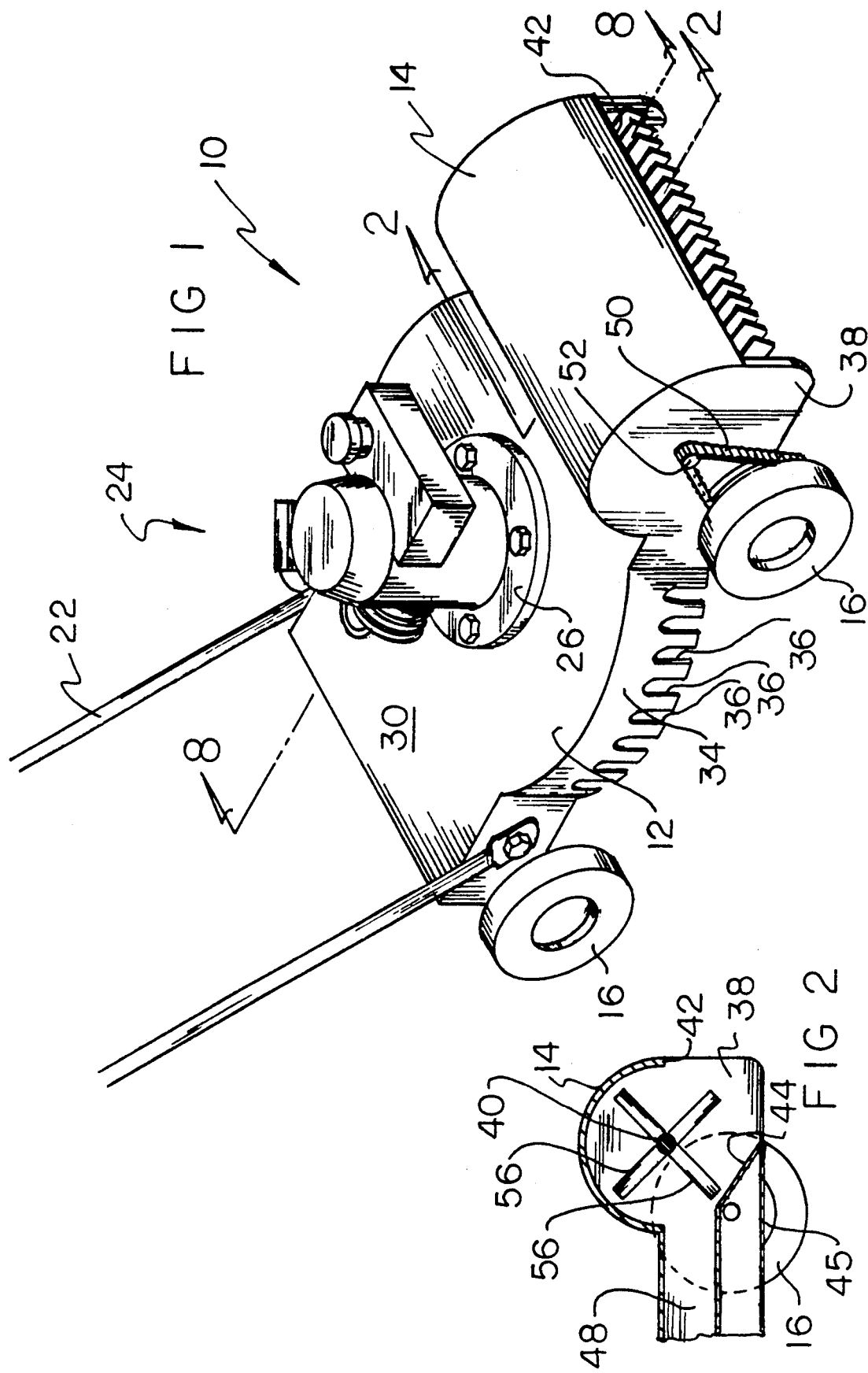

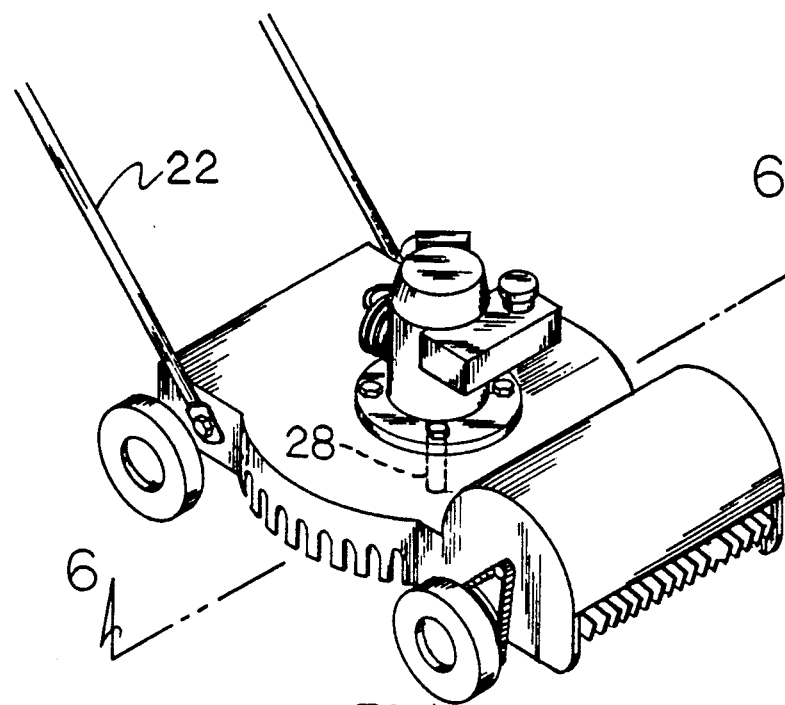
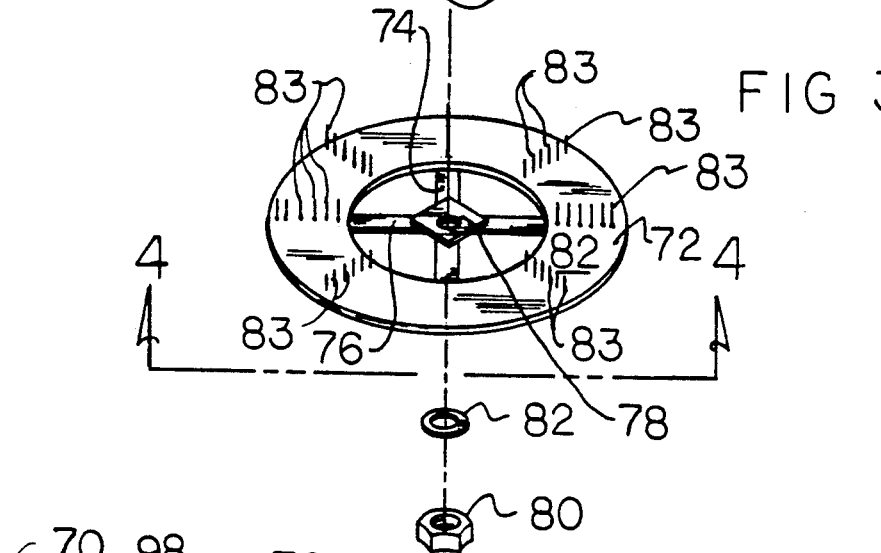
FIG 3
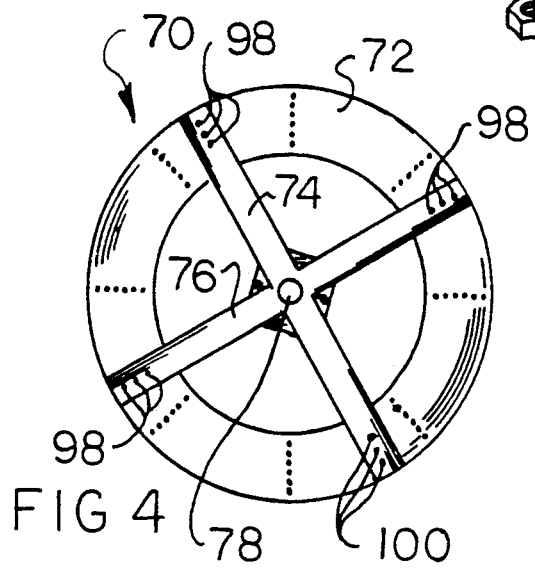
FIG 4
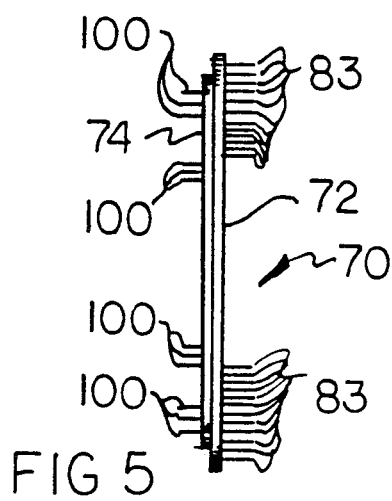
FIG 5

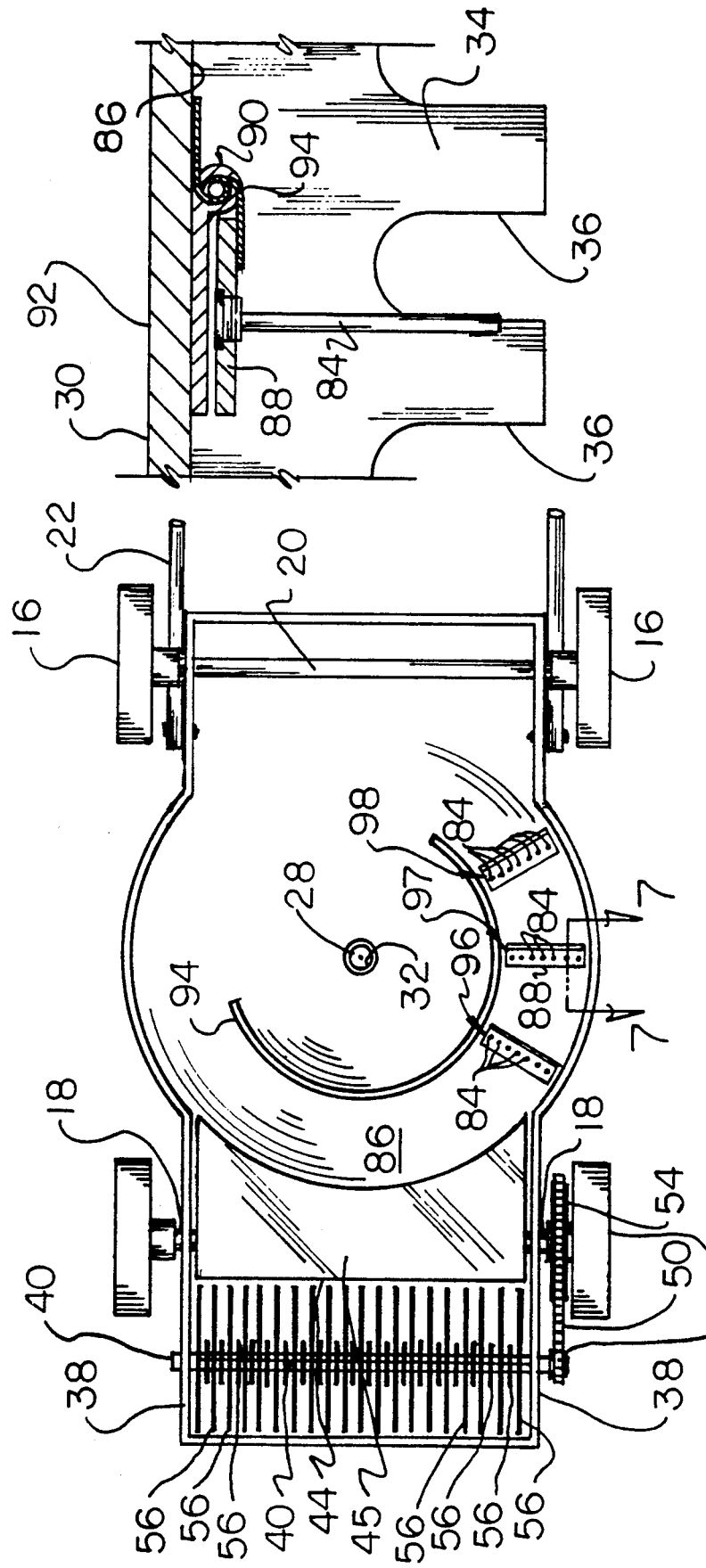

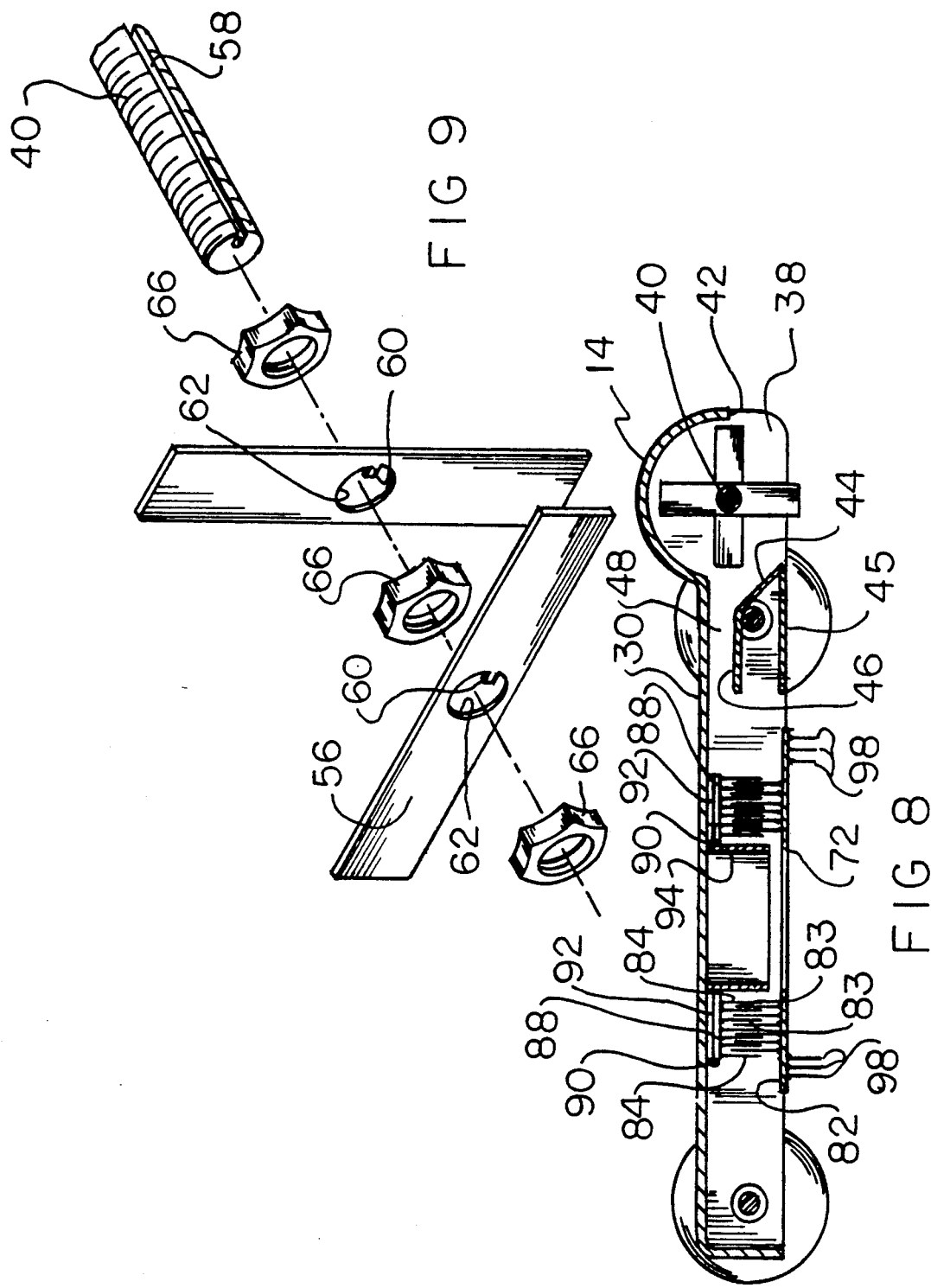

ROTARY MULCHING MOWER

1. Field of the Invention

The present invention relates generally to rotary lawn mowing equipment, and more particularly, to a rotary lawn mulching mower exclusively adapted to gather up fallen leaves or other loose lawn debris and convert same into mulch.

2. Description of the Prior Art

Rotary lawn mowers having attachments for picking up and converting fallen leaves and other lawn debris into mulch generally are known. For example, U.S. Pat. No. 4,967,546, discloses a mulching attachment for a conventional rotary lawn mower. Similarly, U.S. Pat. Nos. 4,292,791, and 3,703,071 describe conventional rotary lawn mowers wherein the rotary blades are modified so as to serve the dual function of cutting grass and mulching leaves. Owing to the fact that each of these prior art devices attempts to combine both grass-cutting and leaf-mulching in a single device, certain compromises in terms of sizing and locating the mulching attachment often result in reduced performance in both areas. This, in turn, renders the combination lawn mower and mulching device less effective than is otherwise desirable. A need clearly exists for a mulching mower which operates in generally the same manner as a rotary lawn mower yet is exclusively designed to achieve maximum efficiency in removing fallen leaves or other lawn debris by converting same into desirable mulch materials. This need is met by the present invention as will be made evident below. Other advantages of the present invention over the prior art also will be rendered apparent.

SUMMARY OF THE INVENTION

To achieve the foregoing and other advantages, the present invention, briefly described, provides a rotary mulching mower having a rotating impeller or rake mounted anteriorly of a shredder rotor assembly. The latter comprises a motor driven rotatable member or rotor supporting circumferentially spaced rows of radially extending shredding pins extending below and above the disk. The upwardly extending pins mesh with complimentary stator pins mounted on the mower housing above the shredding rotor. Leaves or other lawn debris are passed by the impeller into a manifold and then directed via a suitable baffle to the meshing pins to be shredded thereby into mulch whereas the downwardly directed pins function effectively to remove thatch from the lawn being mulch mowed.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least one preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursor inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved rotary mulching mower which has all of the advantages of the prior art and none of the disadvantages.

It is another object of the present invention to provide a new an improved rotary mulching mower which may be easily and efficiently manufactured and marketed.

It is a further objective of the present invention to provide a new and improved rotary mulching mower which is of durable and reliable construction.

An even further object of the present invention is to provide a new and improved rotary mulching mower which is susceptible of a low cost of manufacture with regard to both materials and labor, and which accordingly is then susceptible of low prices of sale to the consuming public, thereby making such rotary mulching mower available to the buying public.

Still yet a further object of the present invention is to provide a new and improved rotary mulching mower which resembles a conventional rotary lawn mower yet is exclusively adapted for removing leaves and other debris and converting same into mulch.

It is still a further object of the present invention to provide a new and improved rotary mulching mower having a rotary leaf rake and a rotary mulching assembly on a single chassis.

Still a further object of the present invention is to provide a new and improved rotary mulching mower including means for avoiding clogging of the mulching assembly due to relatively large twigs, rocks, or the like picked up by the mower.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 1 is a perspective view showing the preferred embodiment of the rotary mulching mower of the invention.

FIG. 2 is a cross-sectional elevational view of a portion of the rotary mulching mower taken along line 2—2 of FIG. 1.

FIG. 3 is an exploded assembly view in perspective of the rotary mulching mower of FIG. 1.

FIG. 4 is a bottom plan view of the rotary shredder assembly taken along 4—4 of FIG. 3.

FIG. 5 is a side elevational view of the rotary shredder assembly of FIG. 4.

FIG. 6 is a bottom plan view of the chassis of the rotary mulching mower of FIG. 1.

FIG. 7 is a partial cross-sectional view of the chassis of FIG. 6 taken along line 7—7 of FIG. 6.

FIG. 8 is a cross-sectional view in elevation of FIG. 1 taken along line 8—8 of FIG. 1.

FIG. 9 is an exploded assembly view of a portion of the rotary rake section of the rotary mulch mower of FIG. 1 specifically showing the manner of attaching the blades to the rake spindle.

DESCRIPTION OF THE PREFERRED EMBODIMENT

With reference now to the drawings, a new and improved rotary mulching mower embodying the principles and concepts of the present invention will be described.

Turning initially to FIG. 1, there is shown the preferred exemplary embodiment of the rotary mulching mower of the invention generally designated by reference numeral 10. In its preferred form, rotary mulching mower 10 comprises a chassis having a rotary mulching section 12 and a rotary rake section 14 substantially as shown. The chassis is supported for movement over a lawn or other substantially flat terrain by first and second pairs of spaced wheels each designated by reference numeral 16. Although mulching mower 10 generally resembles a conventional grass-cutting power lawn mower, it will be understood rather quickly that it is not designed for nor is it capable of such application.

As best seen in FIGS. 6 and 8, each wheel 16 in the first pair is supported for rotatable movement in the wall of rake section 14 by a suitable axle designated by numeral 18. Similarly, each wheel in the second pair is supported for rotatable movement on an axle 20 extending between opposed sides of the chassis aft of rotary mulching section 12. A generally U-shaped push handle 22 is attached at an angle to the chassis by suitable bolt and nut fasteners extending through the free ends of the handle and the side walls of the chassis, respectively, proximal to axle 20 and between axle 20 and the rotary mulching section 12 as substantially shown in FIGS. 1, 3 and 6.

A conventional two-cycle internal combustion engine (i.e. typically a rotary lawn mower engine) designated generally by reference numeral 24, the details of which are well known and form no part of the present invention, is affixed on top of the chassis via a suitable mounting bracket 26 and has a rotatable output shaft 28 extending through top wall 30 of the rotary mulching section through a central aperture 32 disposed therein (see FIG. 6). The rotary mulching section 12 of the chassis is generally cylindrical in shape and has opposed arcuate side walls each designated by reference numeral 34 having a series of spaced slots or notches 36 in its bottom edge as best seen in FIGS. 1, 3 and 7.

Likewise, the rotary rake section 14 generally is cylindrically shaped, but has its main axis extending through wheel axles 18 orthogonal to the axis of output shaft 28 of internal combustion engine 24. The rotary rake section includes a pair of opposed side walls each designated by reference numeral 38 and which serve among other things as a support for rake spindle 40 supported for rotation therein about the aforementioned main axis thereof. As seen to best advantage in FIGS. 1, 2 and 8, the front of the rotary rake section terminates in a recess defined by longitudinal edge 42 extending between opposed side walls 38 which recess serves as a mouth or passage through which leaves and other loose lawn debris may be picked up.

The underside of rotary rake section 14 generally is open underneath spindle 40 and terminates rearwardly in a transverse frame member 44 having an inside ledge 46 spaced below chassis top wall 30 to form a manifold 48 extending between and joining the respective interiors of rotary rake section 14 and rotary mulching section 12 (FIG. 8). It will be noted with reference to FIGS. 2 and 8 in particular, that transverse frame member 44 is disposed at an angle to its bottom section 45 to thereby form a scoop or ramp facilitating the passage of leaves or other debris entering the mouth of the rotary rake section 14 into and through manifold 48 rearwardly toward rotary mulching section 12.

In accordance with the invention, the rotary rake spindle 40 is adapted to be rotated about its axis by an endless chain or drive belt 50 engaging a sprocket gear 52 suitably affixed to the left end of spindle 40 as viewed in FIG. 1 and a sprocket drive wheel 54 suitably affixed to the proximal wheel 16 substantially as shown in FIGS. 1 and 6. By this arrangement, motion of rotary mulch mower 10 in a forward direction will cause wheels 16 to rotate in a clockwise direction thereby driving the rotary rake spindle 40 about its axis in a clockwise direction.

Turning to FIGS. 6, 8 and 9, rake spindle 40 has mounted thereon a series of blades each designated by reference numeral 56 alternating in a criss-cross manner longitudinally of the spindle inside the housing formed by rotary rake section 14.

Spindle 40 includes a longitudinal keyway 58 adapted to cooperate with a key 60 extending radially inwardly with respect to a central through hole 62 disposed in each blade 56 with the key 60 in each alternate blade being disposed ninety degrees apart respectively. Thus, as shown by way of illustration in FIG. 9, the key of one blade 56 extends parallel to the longitudinal axis of the blade whereas in the neighboring blade key 60 extends perpendicular to the longitudinal axis of the blade. It will be appreciated that while only two blades are shown in FIG. 9, there will be, in fact, a much greater number of blades sufficient to span the entire rake spindle 40. The blades are fixedly mounted on the spindle with key 60 engaging key way 58 and with a female threaded nut 66 acting as a spacer disposed between adjacent blades as depicted in FIG. 9. The opposite ends of spindle 40 are rotatably captured in end walls 38 through suitable apertures therein and cap nut fasteners (not shown).

It should now be apparent that when the rotary mulch mower of the invention is pushed forwardly by means of handle 22, wheels 16 will rotate causing endless belt 50 to rotate rake spindle 40 and the blades 56 mounted thereon which action, in turn, will cause any leaves or other debris lying in the path of rotary mulch mower 10 to be scooped or raked up through the mouth of rotary rake section 14 and passed by the impeller-like action of rotating spindle 40 and blades 56 through manifold 48 into rotary mulching section 12.

Turning now to FIGS. 3 through 8, rotary mulching section 12 has in accordance with the invention a shredding rotor assembly designated generally by reference numeral 70 mounted for rotation within the housing formed by the rotary mulching section and about the axis defined by the output shaft of internal combustion engine 24. Assembly 70 comprises a substantially flat disc or ring 72 and a supporting frame member made up of a pair of orthogonally arranged arms 74, 76 crisscrossing at their center and attached to ring 72 at their respective distal extremities in a suitable manner as by fasteners, rivets, welds or the like.

A central aperture 78 extending through the crisscrossed arms is sized to receive the output shaft 28 of internal combustion engine 24 through aperture 32 in top wall 30 of the rotary mulching section 12 so that the shredding rotor assembly may be fixed to output shaft 28 by means of female threaded fastener 80 and lockwasher 82.

In accordance with an important feature of the invention, the top surface 82 of ring member 72 has separate rows of radially spaced shredding pins each designated by reference numeral 83 fixedly secured thereto in a suitable manner so as to extend upright with respect to the top surface 82. In the preferred embodiment, there are eight such rows evenly spaced about the circumference of ring 72 with each row consisting of six such pins 83.

Referring now to FIGS. 6 and 7, a series of stator pins each designated by reference numeral 84 and each being of generally the same size, nature and extent as pins 83 is supported from the ceiling 86 defined by rotary mulching section 12 and extends downwardly toward top face 82 of ring 72. The stator pins 84 are fixedly secured in a suitable manner to a flat mounting plate 88 supported along one longitudinal edge through a hinge connection generally designated by reference numeral 90 to a similar support plate 92 suitably affixed to ceiling 86 (FIG. 7). A suitable spiral spring member 95 is provided in hinge connection 90 to normally resiliently bias support plate 88 into the position shown in FIG. 7 with respect to its hinged support plate 92. Spring member 94, however, permits support plate 88 to pivotally flexurally displace about the axis of hinge connection 90 in the presence of a force imposed against pins 84 as would occur in the event a rock, large twig or the like enters the rotary mulching section from manifold 48 in which case the aforementioned pivotal displacement of pins 84 and plate 88 would be sufficient to permit the rigid unshreddable object to pass harmlessly through the stator pin assembly area and out through the notches 36 in side wall 34 following which spring 90 will resiliently urge support plate 88 and the pins 84 carried thereby to return to their normal position as shown in FIG. 7.

In the preferred embodiment illustrated, three radially extending rows of stator pins 84 are employed with the rows being spaced relatively close together on the right side of the rotary mulching section substantially as viewed in FIG. 6. The shredder rotor assembly 70 is mounted on the output shaft 28 of internal combustion engine 24 at a distance below ceiling 86 sufficient to enable each upstanding pin 83 on face 82 of ring 72 to mesh with and pass between a corresponding downwardly extending pair of adjacent stator pins 84 as the assembly 70 rotates in a counterclockwise direction. Hence, as depicted in FIG. 8, each row of stator pins 84 consists of a radially spaced row of seven such pins with the stator pins and the upstanding pins being spaced apart sufficiently to avoid interference therebetween and impede the rotation of the shredder assembly on output shaft 28.

In order to facilitate the passage of the leaves and other debris passing through manifold 48 into the meshing pins 83, 84 where they will be shredded and converted to mulch, a semi-cylindrical baffle 94 is suitably affixed to ceiling 86 and extends downwardly therefrom substantially as shown in FIGS. 6 and 8. Arranged as shown, baffle 94 serves as a funnel, urging the leaves and other debris exiting from manifold 48 into the first row of stator pins designated generally by reference numeral 96, then the second row 97, and finally, the third row 98. By this successive arrangement of meshing pins, in the accordance with the invention, there is a progressive and complete shredding of any leaves, twigs, etc. entering the mouth or rotary rake section of mower 10. Hence, by the time the loose lawn material exits the third row 98 of stator pins, it is substantially entirely divided into fine particles and is easily deposited as desirable mulching material on the lawn through the notches 36 in sidewall 34.

In accordance with another feature of the invention, the bottom surface of the rotor assembly, preferably the underside of the distal extremities of arms 74, 76 serves as a mounting surface for yet a third series of downwardly extending pins each designated by reference numeral 100. Pins 100 are similar to pins 83, 84 and are disposed in radial rows of three pins each on the distal extremities of arms 74, 76, respectively. Pins 100 extend low enough to serve as a dethatching instrument when the rotor assembly is being driven by the output shaft 28 and thus enable the mulching mower 10 of the invention to simultaneously remove thatch from the lawn area being cleared of leaves or other debris.

It is apparent from the above description that the present invention accomplishes all of the objectives set forth by providing a new and improved rotary mulching mower that is low in cost, relatively simple in design and operation, and which may advantageously be used to simultaneously remove leaves and other loose debris from a lawn, dethatch the lawn and deposit desirable mulch material on the lawn area thereby returning valuable nutrients to the landscape.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved rotary mulching mower comprising:

a chassis having a rake section and a mulching section, said chassis including means for traversing a lawn, said rake section having impeller means for gathering lawn debris and feeding it to said mulching station, and said mulching station having shredding means for converting said lawn debris to mulch, wherein said shredding means comprises an annular member mounted on said chassis, means connected to said annular member for causing rotation of said annular member about an axis orthogonal to the path of traversing movement of said chassis, a first multiplicity of spaced shredding pins mounted on said annular member for rotation therewith, a second multiplicity of spaced shredding pins affixedly mounted on said chassis in proximity to the path of rotation of said first multiplicity of pins on said annular member, and confining means on said chassis between said mulching station and said raking station for guiding lawn debris from said raking station to said second multiplicity of pins, and wherein said traversing means comprises a multiplicity of wheels mounted on said chassis and said rake section impeller means comprises a rotatable spindle mounted on said chassis, said spindle having a multiplicity of blades attached thereto, and transmission means connected between said spindle and at least one of said wheels for causing rotation of said spindle upon traversing movement of said chassis.

2. The invention of claim 1 wherein said raking station is mounted anteriorly of said mulching station on said chassis, said raking station having an opening communicating with said impeller means, and said confining means comprises a manifold extending between said impeller means and said second multiplicity of spaced shredding pins.

3. The invention of claim 2 wherein said confining means further comprises baffle means mounted on said chassis in the proximity of said second multiplicity of spaced shredding pins.

4. The invention of claim 3 wherein said second multiplicity of spaced shredding pins comprises at least one row of spaced pins mounted in said chassis proximal to the path of rotation of said annular member wherein said at least one row extends radially with respect to said annular member, said at least one row of shredding pins being mounted on a plate, said plate being supported on said chassis by pivotal means, and resilient means for pivotally urging said plate toward said annular member, said resilient means adapted to permit pivotal displacement of said plate away from said annular member in the presence of a nonshreddable object carried by said first multiplicity of spaced shredding pins and impinging against said at least one row of spaced pins in said second multiplicity thereof.

5. The invention of claim 4 wherein said annular member has first and second opposed faces, said first multiplicity of shredding pins being mounted on said first face of said annular member, said chassis having a top wall, said means for causing rotation of said annular member comprising drive means mounted on said top wall of said chassis, said drive means having a rotating output shaft extending through an opening in said top wall, and said annular member being connected to said output shaft below said top wall whereby said first multiplicity of spaced shredding pins extends upwardly from said first face toward said chassis top wall.

6. The invention of claim 5 wherein said second multiplicity of shredding pins is affixed to said top wall and extends downwardly toward said first face of said annular member.

7. The invention of claim 6 further including a third multiplicity of spaced shredding pins mounted on said second face of said annular member whereby said third multiplicity of pins is adapted to dethatch the area of lawn traversed by said chassis.

8. The invention of claim 1 wherein said multiplicity of blades mounted on said spindle comprise blades affixed to said spindle in an alternating othogonal relationship.

* * * * *